March 12, 1940.  L. E. WILLARD  2,192,876
SHOCK ABSORBER
Filed April 1, 1939  2 Sheets-Sheet 1
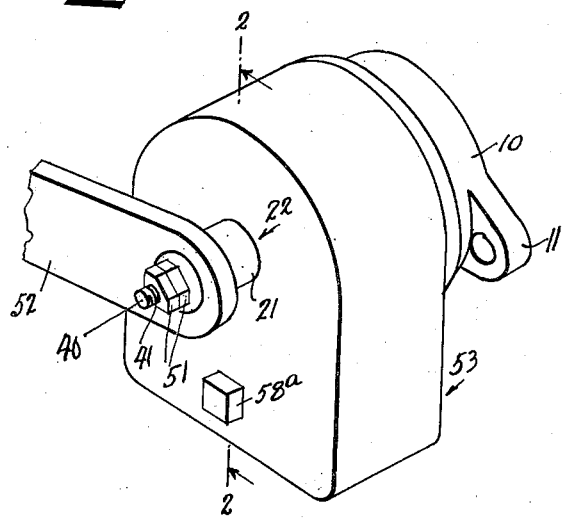
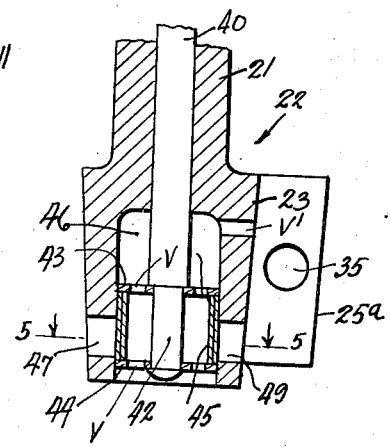
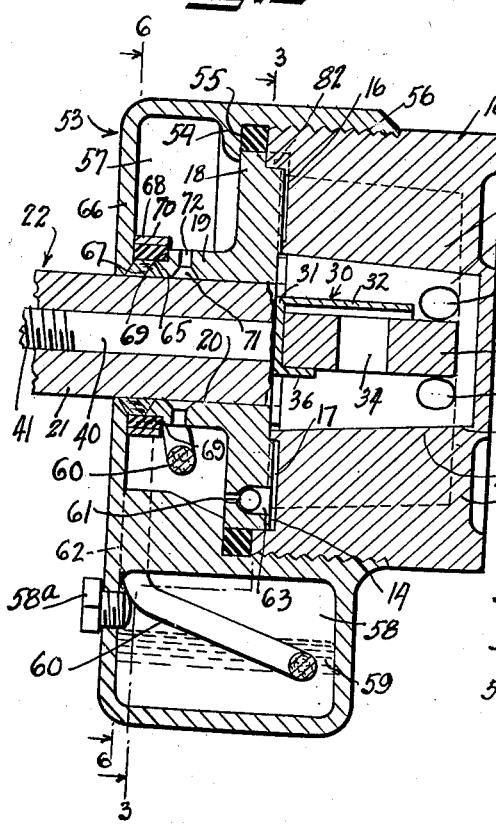
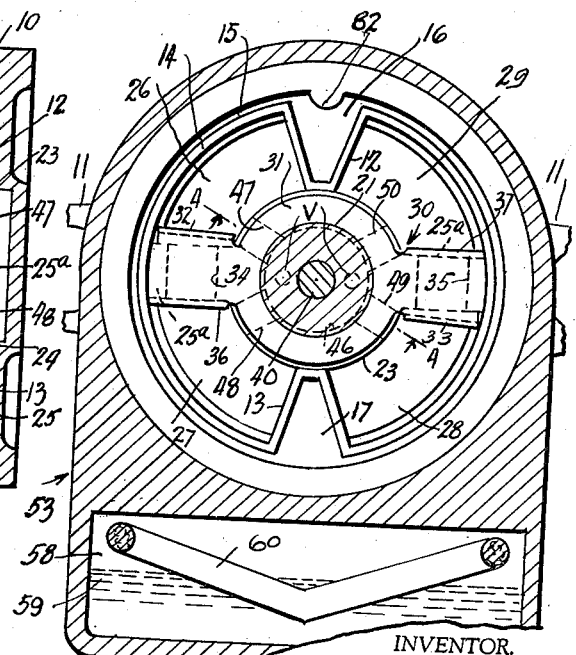
INVENTOR.
Louis E. Willard
BY Joshua E. Davidson
ATTORNEY.

March 12, 1940.  L. E. WILLARD  2,192,876
SHOCK ABSORBER
Filed April 1, 1939  2 Sheets-Sheet 2
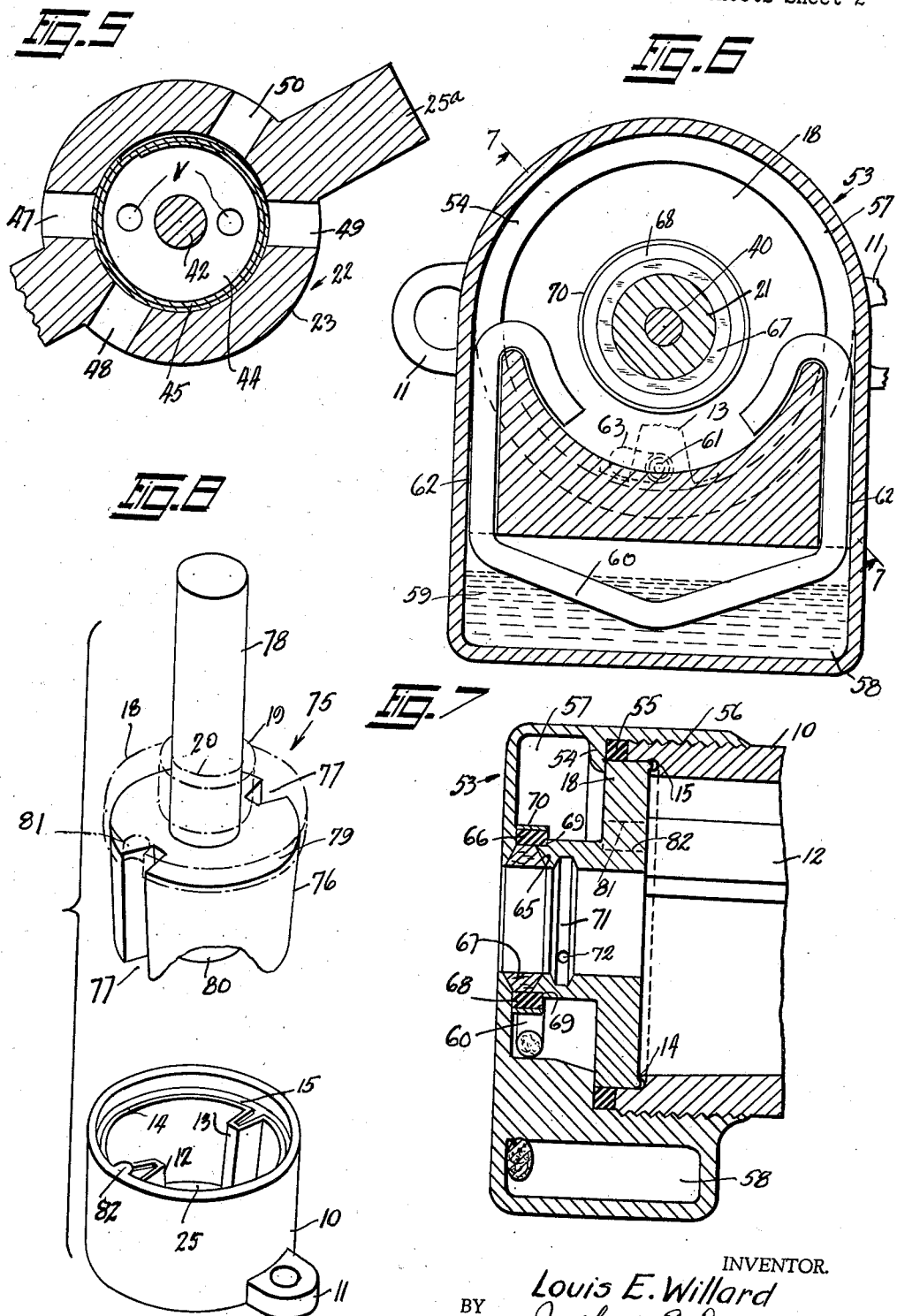
INVENTOR.
Louis E. Willard
BY Joshua E. Davidson.
ATTORNEY.

Patented Mar. 12, 1940

2,192,876

UNITED STATES PATENT OFFICE 2,192,876

SHOCK ABSORBER

Louis E. Willard, New York, N. Y., assignor to
Charles Zimmer, Brooklyn, N. Y.

Application April 1, 1939, Serial No. 265,452

18 Claims. (Cl. 188—89)

This invention relates to shock absorbers generally and more particularly to shock absorbers of the oscillating piston type shown and described in my Patent No. 2,149,129, dated February 28th, 1939, and to the method of making same.

One object of the invention is the provision of a shock absorber of this type or of a door check which will be leakproof and will not be affected by hot or cold water.

Another object of the invention is the provision of a shock absorber, which, instead of using the usual compression liquid or fluid, utilizes a paste-like medium of graphite or similar material saturated with alcohol or other anti-freeze fluid, said fluid being fed to the paste-like medium by capillary means, such feeding occurring only whenever any portion of the liquid content of the mixture is lost by disintegration or evaporation.

A further object of the invention is to provide means for the finishing and truing of certain surfaces which will greatly reduce the manufacturing cost of such shock absorbers.

Still another object of the invention is the provision of a spring coil pop valve in combination with four ports, all in one horizontal plane, that will serve the dual purpose of adjusting the amount of effective opening of the said ports and release when overloaded.

Another object is to produce a device of the character described in which the maximum simplicity of construction and operation is secured.

Other objects and advantages will appear as the nature of the improvements is better understood, the invention consisting substantially in the novel arrangement and corelation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1 is a perspective view of a shock absorber made in accordance with my invention;

Fig. 2 is a sectional view thereof taken on line 2—2, Fig. 1;

Fig. 3 is a sectional view taken on line 3—3, Fig. 2;

Fig. 4 is a fragmental sectional view of the lower portion of the oscillating piston, taken on line 4—4, Fig. 3;

Fig. 5 is a cross-sectional view of the said piston taken on line 5—5, Fig. 4;

Fig. 6 is a sectional view taken on line 6—6, Fig. 2;

Fig. 7 is a fragmental sectional view taken on line 7—7, Fig. 6, with the piston omitted therefrom; and Fig. 8 is a perspective view showing the forming or furnishing die and piston bearing in position above the working chamber ready to be pressed thereinto for finishing the interior surfaces of the said chamber.

Referring now to the drawings in detail, 10 indicates the outer casing of the shock absorbers which at one end theref, is provided with a pair of lugs 11 for securing same to the chassis of the automobile, aeroplane, or the like, in connection with which it is used and in the ordinary manner and position in which such shock absorbers are usually mounted. In the oscillating piston type of shock absorbers now commonly used, a machined cylinder or ring having a pair of wings is secured in the lower interior portion of the said casing to form a compartmented compression chamber. In the present form of my invention, in order to avoid the costly operation of machining or finishing of the said cylinder or ring, I provide wings 12 and 12, which are integral with the casing 10, the said casing being preferably made of a soft steel casting.

The said casing 10 is provided with a shoulder 14 having an annular depression 15 which opens into V-shaped depressions 16 and 17 in the wings 12 and 13 respectively. Resting upon the shoulder 15 is an inner cover 18 having a boss 19 provided with a central bore 20 which acts as a bearing for the shaft or stem portion 21 of an oscillable piston 22. The piston 22 is provided with an enlarged cylindrical portion 23 which fits rotatably in a depression 24 in the bottom wall 25 of the casing 10, said depression forming a bearing for the enlarged piston portion 23. The said enlarged portion 23 is provided with a pair of blades or wings 25a which, with the stationary wings 12 and 13, divide the compression chamber into four compartments, 26, 27, 28 and 29, respectively, as shown in Fig. 3.

Swingably mounted on the stem 21 of the piston 22 is a yoke valve 30 comprising a base 31, plates 32 and 33 bent therefrom, said plates covering port holes 34 and 35 respectively in the wings 25a when the piston is moving in counterclockwise direction. Short depending projections 36 and 37 act to limit the oscillatory movement of the yoke valve 30.

Passing centrally through the piston 22 is a valve stem or rod 40 having screw threads 41 by which it may be adjusted within the piston 22. The innermost end of the said valve stem 40 is provided with a reduced portion 42 (see Fig. 4) upon which there are secured a pair of spaced apart disks 43 and 44, between which there is positioned a contractable and expansible spirally wound flat spring 45 preferably comprising a clock spring of two coils under tension, the said spring and disks being housed in a cylindrical cavity or opening 46 in the enlarged piston portion 23, which, near the bottom thereof, is provided with four valve ports 47, 48, 49 and 50. The valve ports 47 to 50 are all in the same vertical plane and are controlled by the spring closure means 45. In other words, the valve arrangement just described takes the place of the usual throttle valve arrangement used in this type of shock absorbers. A second very important function of the contractable or collapsible clock spring valve port closure means is to collapse or contract when the vehicle to which the shock absorber is secured passes over an unusually deep depression or high obstruction in the road, thus relieving the excess pressure placed on the shock absorber. In other words the clock spring valve in this instance functions as a pop valve. The adjustable valve stem 40 is locked in place by a pair of nuts 51 and the shock absorber shaft portion 21 is connected to the vehicle axle by means of an arm or link 52. Vents V in the disks 43 and 44 and a vent V' in the piston enlargement 23 prevent the building up of pressure in the pop valve mechanism above described, and also the formation of air pockets. The valve is adjusted horizontally with respect to the ports 47—50 by means of the rod 40 to open or close said ports and locked in place by the nuts 51 to obtain the necessary resistance of the shock absorber with reference to any given car.

The action of the valve 45 is as follows: When the ports 47—50 are fully covered by the said valve 45, then when the car passes over an abnormal obstruction, the pressure of the compression medium is great enough to collapse the clock spring and permit the said medium to pass from the high pressure compartments 26 and 28 through ports 47 and 49 out into the low pressure compartments 27 and 29 through the ports 48 and 50. When the ports are adjusted to a fully or a partially open position depending upon the necessary resistance of the shock absorber, then the compression medium will normally without popping the valve 45 pass through the ports from the high to the low pressure compartments.

However, when the ports are fully closed but the shock absorber is under normal load the compression medium will escape or by-pass from the high pressure compartments to the low pressure compartments through the normal leakage between the operating parts.

Screwthreadedly secured to the shock absorber casing 10 is a cover 53 which is provided with an inner annular flange 54 between which and the top of the casing 10 there is located an annular gasket 55 which also fits around the outer circumference of the inner cover 18 to seal the casing 10 at the threaded portion 56. The said cover 53 is provided with an upper chamber 57 and a lower chamber 58, the upper chamber being utilized as a reservoir chamber for the compression medium or material used, which, in the present instance, is a semi-solid mixture comprising either powdered talc, graphite or other suitable material saturated with alcohol or other non-freezing fluids. The lower chamber 58 contains the non-freezing fluid 59 which, by capillary means such as a wick 60 or other suitable means, feeds the said liquid to the compression chamber through the valve 61 when any of the liquid from the mixture becomes evaporated or disintegrated. It will be noted that the wick 60 is threaded through substantially long openings 62 so that none of the liquid 59 can enter the chamber by splashing when the car goes over deep or steep ravines, etc. It will also be noted that the valve port 63 of the ball valve 61 is somewhat elongated to clear the wing 13 (see Fig. 6), so that the passage of the compression medium into the compression chamber is not obstructed.

The inner cover hub 19 is provided with a countersunk opening 65 in which and between the end wall 66 of the cover 53, there is firmly held a packing washer 67 made of any suitable material as rubber, cork, or the like, which is surrounded by an annular gasket 68 which bears against the inner surface of the wall 66 and a shoulder 69 cut on the hub 19. A ring 70 acts to force the gasket 68 against the packing washer 67 and effectively seal the reservoir chamber 57 while the washer 67 seals the device against leakage from the compression chamber between the piston shaft 21 and the walls of the bore in the inner cover 18. Instead of using a solid ring 70, I may, if desirable, use a ring made of slightly more than one coil of a clock spring. A groove 71 and a pair of holes 72 in the hub 19 provides means for returning any of the compression medium which may seep through the shaft bore in the said hub back into the reservoir chamber 57. The liquid chamber 58 is closed by a stud 58a, which, when removed, provides means for refilling the said chamber.

It is to be understood that by the use of my new and highly viscous semi-solid compression mixture, a greater amount of internal resistance to shock is possible than by the use of the ordinary glycerine and alcohol mixtures commonly used in shock absorbers. It is further to be understood that due to the density of my semi-solid mixture, it will not, under normal or even under somewhat abnormal conditions, flow out through any crevices; consequently, no leakage can take place. Any of the volatile liquid used with the mixture which may vaporize in the chamber 57 cannot reach the exterior of the device and evaporate due to the packing 67 and the valve 61. Attention is also called to the fact that no syphoning of the liquid 59 can occur since the valve 61 is above the level or gravity line of the said liquid in the chamber 58, the said liquid flowing only due to capillary action when the balance between it and the solids in the mixture is upset due to evaporation.

As stated above, the provision of a machined piston cylinder or ring greatly adds to the cost of manufacturing shock absorbers. In order to eliminate, to a great extent, such cost, I provide smooth and finished working surfaces in the interior of the casing 10 by the use of a high grade steel die 75 (see Fig. 8), the said die comprising a slightly tapering head 76 having diametrically opposite longitudinally extending V-shaped grooves 77 in the periphery thereof and a shank 78 extending from the said head. The said shank is slightly larger in diameter than the bore 20 in the hub 19 of the inner cover casting 18 so that by forcing the said cover over the said shank until the undersurface of the said casting contacts the top surface 79 of the die head 76, the bore 20 will be finished and the casting under-surface will be square therewith.

With the cover casting 18 in place on the die, the said die is forced down by great pressure into the casing 10 with the grooves 77 in engagement with the wings 12 and 13 in the said casing. The die is forced down until the bottom surface of die projection 80 reaches the bottom of the depression 24 in the casing 10. During the said operation, the die head which is somewhat larger in diameter than the casing chamber, will force out all unevenness in the said chamber walls. Likewise, a square and true seat will be formed between the bottom surface of the cover casting and the shoulder 14 on the casing 10, some of the material of the said casting flowing into the annular casing groove 15. A cutout 81 in the casting 18 and a tongue 82 in the casing 10 form indexing means for properly alining or assembling the said parts. With the parts thus in position, the casing 10 is then screwthreaded at 56 using the stem 78 as a centering means. Due to the tapered side of the die head, it will come out of engagement with the interior of the casing 10 by slightly tapping same after the above described operation.

From the foregoing, it will be seen that I have provided a highly efficient, leakproof shock absorber in which the compression medium will not become unduly affected by changes in temperature and a method for producing same in an inexpensive manner.

While I have described my invention as relating to shock absorbers, the construction and principle of same may just as readily be applied to door checks and the like. The operation of my improved shock absorber in most respects is the same as that covered by my Patent 2,149,129 dated Feb. 28, 1939, with the addition that in the present invention I have provided the combined pop and adjustable thrust valve fully described above and have also provided the capillary feed for maintaining the density of the compression medium.

Having described my invention, what I claim as new and desire to secure by Letters Patent is:

1. In a shock absorber of the nature described, a casing providing a working chamber, radially spaced apart fixed wings therein, an oscillatory piston in the said chamber, wings on the piston which together with the chamber wings subdivide the chamber into compartments, the said piston having an enlarged cavity at one end, valve ports, one for each compartment leading from the said cavity, the said ports all being in the same vertical plane, and a valve made of spirally wound flat spring material adjustably maintained in the said cavity for controlling the said valve ports.

2. In a shock absorber of the nature described, a casing providing a working chamber, radially spaced apart fixed wings therein, an oscillatory piston in the said chamber, wings on the piston which together with the chamber wings subdivide the chamber into compartments, the said piston having a central longitudinal bore terminating in an enlarged cavity, a valve stem longitudinally adjustably mounted in the said bore and extending into the cavity, valve ports, one for each compartment leading from the said cavity, all of the said ports being in the same vertical plane, and a valve made of spirally wound flat spring material carried by the said stem for controlling the said valve ports.

3. For use in a shock absorber of the nature described, an oscillatory piston having an enlarged cavity, a plurality of radiating valve ports opening outwardly from the said cavity, the said ports all being in one vertical plane, and a valve made of spirally wound flat spring material longitudinally adjustable in the said cavity for controlling the said valve ports.

4. For use in a shock absorber of the nature described, an oscillatory piston having an enlarged cavity, a pair of wings on the said piston, the said wings having valve openings, a yoke valve oscillatably mounted on the said piston to close the valve opening when the piston is moved in one direction and to open same when moved in the opposite direction, a plurality of valve ports opening outwardly from the said cavity, the said ports all being in one vertical plane, and a valve made of spirally wound flat spring material adjustably maintained in the said cavity for controlling the said valve ports.

5. In a shock absorber of the nature described, a casing providing a working chamber, radially spaced apart fixed wings therein, an oscillatory piston in the said chamber, wings on the piston which together with the chamber wings, subdivide the chamber into compartments, the said piston having an enlarged cavity at one end, valve ports, one for each compartment, leading from the said cavity, the said ports all being in the same vertical plane, a valve made of spirally wound flat spring material adjustably maintained in the said cavity for controlling the said valve ports, the said piston wings having check valve openings, a yoke oscillatably mounted on the said piston, and means carried by the said yoke to close the check valve openings when the piston is moved in one direction and to open same when the said piston is moved in the opposite direction.

6. In a shock absorber of the nature described using a semi-solid or semi-fluid compression medium, a casing providing a working chamber containing the said compression medium, a liquid containing chamber, and capillary means for feeding the said liquid from the liquid containing chamber to maintain the said medium in proper density.

7. In a shock absorber of the nature described using a semi-solid or semi-fluid compression medium, a casing providing a working chamber containing the said compression medium, radially spaced apart fixed wings therein, an oscillatory piston in the said chamber, wings on the piston which together with the chamber wings subdivide the chamber into compartments, the said piston having an enlarged cavity therein, valve ports, one for each compartment leading from the said cavity, the said ports all being in the same vertical plane, a valve adjustably maintained in the said piston cavity for controlling the said ports, a liquid containing chamber, and capillary means for feeding the said liquid from the liquid containing chamber to maintain the said medium in proper density.

8. In a shock absorber of the nature described using a semi-solid or semi-fluid compression medium, a casing providing a working chamber containing the said compression medium, radially spaced apart fixed wings therein, an oscillatory piston in the said chamber, wings on the piston, which together with the chamber wings subdivide the chamber into compartments, the said piston having an enlarged cavity therein, valve ports, one for each compartment leading from the said cavity, the said ports all being in the same vertical plane, a valve made of a plurality of clock spring coils, adjustably maintained in the said piston cavity for controlling the said ports, a liquid containing chamber, and capilliary means for feeding the said liquid from the liquid containing chamber to maintain the said medium in proper density.

9. In a shock absorber of the nature described, using a semi-solid or semi-fluid compression medium, a casing providing a working chamber containing the said compression medium, radially spaced apart fixed wings therein, an oscillatory piston in the said chamber, wings on the piston, which together with the chamber wings subdivide the chamber into compartments, the said piston having an enlarged cavity therein, the said piston wings having check valve openings, a yoke oscillatably mounted on the said piston, means carried by the said yoke to close the check valve openings when the piston is moved in one direction and to open same when the said piston is moved in the opposite direction, valve ports, one for each compartment, leading from the said cavity, the said ports all being in the same vertical plane, a valve adjustably maintained in the said piston cavity for controlling the said ports, a liquid containing chamber, a reservoir and capillary means for feeding the said liquid from the liquid containing chamber to the reservoir from which it may pass to the working chamber to maintain the said medium in proper density.

10. In a shock absorber of the nature described, using a semi-solid or semi-fluid compression medium, an open end casing providing a working chamber containing the said compression medium, an inner cover abutting the open end of the casing, a piston oscillatably mounted in the cover, a valve in the said cover leading into the working chamber, an outer cover secured to the casing, a compression medium reservoir in the said outer cover in communication with the inner cover valve, a liquid containing chamber in the outer cover, and capillary means leading from the said liquid containing chamber to the reservoir for the purpose specified.

11. In a shock absorber of the nature described using a semi-solid or semi-fluid compression medium, an open end casing providing a working chamber containing the said compression medium, an inner cover closing the open end of the casing, a piston oscillatably mounted in the cover, a valve in the said cover leading into the working chamber, an outer cover secured to the casing, a compression medium reservoir in the said outer cover in communication with the inner cover valve, a liquid containing chamber in the outer cover, capillary means leading from the said liquid containing chamber to the reservoir for the purpose specified, a packing bushing between the outer and inner covers, a gasket surrounding the said packing bushing and means for pressing the said gasket against the periphery of the packing.

12. In a shock absorber of the nature described using a semi-solid or semi-fluid compression medium, an open end casing providing a working chamber containing the said compression medium, an inner cover closing the open end of the casing, a piston oscillatably mounted in the cover, radially spaced apart fixed wings on the casing, wings on the piston, which together with the casing wings divide the chamber into compartments, the said piston wings having check valve openings, a yoke oscillatably mounted on the said piston, means carried by the said yoke to close the check valve openings when the piston is moved in one direction and to open same when the said piston is moved in the opposite direction, the said piston having an enlarged cavity, valve ports, one for each compartment leading from the said piston cavity, the said ports all being in the same vertical plane, a clock spring valve adjustably maintained in the said cavity for controlling the said valve ports, a valve in the said cover leading into the working chamber, an outer cover secured to the casing, a compression medium reservoir in the said outer cover in communication with the inner cover valve, a liquid containing chamber in the outer cover, and capillary means leading from the said liquid containing chamber to the reservoir for the purpose specified.

13. In a shock absorber of the nature described an open end casing providing a working chamber, a shoulder at the said open end, the said shoulder being provided with an annular groove, an inner cover abutting the said shoulder to close the open end of the casing, an annular bead-like formation on the cover extending into the groove, a piston oscillatably mounted in the cover, a valve in the said cover leading into the working chamber, an outer cover secured to the casing, a compression medium reservoir in the said outer cover in communication with the cover valve, a liquid containing chamber in the outer cover below the reservoir, and capillary means leading from the said liquid containing chamber to the reservoir for the purpose specified.

14. For use in a shock absorber of the nature described, a piston having a longitudinal bore terminating in an enlarged cavity, the said piston being provided with radially spaced apart valve ports extending from the cavity, a stem longitudinally adjustable in the said bore and extending into the cavity, and an expansible and contractable clock spring pop valve in the cavity normally exerting a tension against the side walls of the cavity and carried by the stem for controlling the flow of shock absorber compression medium through the said valve ports.

15. For use in a shock absorber of the nature described, a piston having a longitudinal bore terminating in an enlarged cavity, the said piston being provided with radially spaced apart valve ports extending from the cavity, the said ports all being in a plane at right angles to the bore, a stem longitudinally adjustable in the said bore and extending into the cavity, and an expansible and contractable clock spring pop valve in the cavity normally exerting a tension against the side walls of the cavity and carried by the stem for controlling the flow of shock absorber compression medium through the said valve ports.

16. For use in a shock absorber of the nature described, a piston having a longitudinal bore terminating in an enlarged cavity, the said piston being provided with radially spaced apart valve ports extending from the cavity, the said ports all being in the same plane and at right angles to the bore, a stem longitudinally adjustable in the said bore and extending into the cavity, and an expansible and contractable clock spring pop valve in the cavity normally exerting a tension against the side walls of the cavity and carried by the stem for controlling the flow of shock absorber compression medium through the said valve ports.

17. In a shock absorber of the nature described, a casing providing a working chamber, an oscillatable piston in the chamber, a semi-fluid compression medium in the chamber, valving means on the piston through which the said medium is adapted to be periodically forced, a liquid containing chamber, a reservoir in communication with the working chamber and capillary means for feeding the liquid from the said chamber to the said reservoir for maintaining the compression medium in proper density.

18. In a shock absorber of the nature described using a semi-solid or semi-fluid compression medium, a casing providing a working chamber containing said compression medium, a reservoir in communication with the said chamber, a liquid containing chamber, and capillary means for feeding the said liquid to the reservoir from which it may pass to the working chamber to maintain the said medium in proper density.

LOUIS E. WILLARD.